(12) United States Patent
Ikegami et al.

(10) Patent No.: US 7,941,239 B2
(45) Date of Patent: May 10, 2011

(54) PLC

(75) Inventors: Kenichi Ikegami, Inazawa (JP); Tsutomu Araki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 241 days.

(21) Appl. No.: 12/147,970

(22) Filed: Jun. 27, 2008

(65) Prior Publication Data

US 2009/0005884 A1    Jan. 1, 2009

(30) Foreign Application Priority Data

Jun. 29, 2007    (JP) .................................. 2007-172465

(51) Int. Cl.
*G06F 19/00* (2011.01)
*G06F 9/44* (2006.01)
*G05B 15/00* (2006.01)
*G05B 11/01* (2006.01)

(52) U.S. Cl. ............ 700/180; 700/11; 700/83; 700/245; 700/258; 717/104; 717/120; 717/127; 717/131

(58) Field of Classification Search .................... 700/11, 700/180, 83, 245, 258; 717/104, 120, 127, 717/131
See application file for complete search history.

(56) References Cited

U.S. PATENT DOCUMENTS

| | | | |
|---|---|---|---|
| 6,868,538 B1 * | 3/2005 | Nixon et al. | ................... 717/100 |
| 7,286,885 B2 | 10/2007 | Niwa | |
| 7,698,600 B2 * | 4/2010 | Araki et al. | ...................... 714/43 |
| 2003/0083772 A1 * | 5/2003 | Shiba et al. | ................... 700/180 |
| 2004/0010326 A1 | 1/2004 | Schuster | |
| 2007/0016310 A1 | 1/2007 | Niwa | |
| 2007/0244571 A1 * | 10/2007 | Wilson et al. | .................... 700/11 |
| 2008/0127065 A1 * | 5/2008 | Bryant et al. | .................. 717/109 |

FOREIGN PATENT DOCUMENTS

| | | |
|---|---|---|
| EP | 0 386 260 A1 | 9/1990 |
| EP | 1772787 A1 * | 4/2007 |
| JP | 2007-25736 | 2/2007 |

OTHER PUBLICATIONS

Lewis-R., "Can IEC 61131 Graphical Languages be used for Safety Related PLC Applications?", 2002, Senior Consultant, Advantage Technical Consulting, 7 pages.*

Extended European Search Report issued Oct. 28, 2010, in Application No. 08159189.3-1239/4009529, 7 pages.

* cited by examiner

*Primary Examiner* — Albert Decady
*Assistant Examiner* — Thomas Stevens
(74) *Attorney, Agent, or Firm* — Oblon, Spivak, McClelland, Maier & Neustadt, L.L.P.

(57) ABSTRACT

The PLC according to this invention includes I/O modules, a CPU module, an input/output bus, and a PC having a display. The CPU module includes a control program storage unit which previously stores an intrinsic control program in which operation processing and an input/output information item are packaged; a library which previously stores the function block representing the operation processing; and a header file which previously stores equivalent input/output information equivalently representing the input/output information by a graphical language. Referring to the library and header file, PC causes the execution program created and stored in the main storage unit to be displayed on the display by the function block and equivalent input/output information item.

9 Claims, 5 Drawing Sheets

PLC

This application is based upon and claims the benefit of priority of Japanese Patent Application No. 2007-172465 filed on Jun. 29, 2007, the contents of which are incorporated herein by reference in its entirety.

BACKGROUND OF THE INVENTION

This invention relates to a PLC (programmable logic controller).

The PLC includes an I/O module to which an external device is electrically connected, a CPU module which executes an execution program for controlling the external devices through the I/O module, etc. The PLC permits a user to freely program the execution program. However, in order to program the execution program, considerable knowledge on the PLC is required. Namely, in order that the user creates the execution program, considerable knowledge and labor are required.

Now, as an example of the PLC, a safety PLC is cited. In the safety PLC, advanced knowledge on safety control as well as the knowledge on the PLC is required. The safety PLC includes an I/O module to which a safety device such as an emergency stop switch or a light curtain is connected, a CPU module which executes a safety program (corresponding to the above execution program) for controlling the safety devices through the I/O module, etc.

The safety PLC employed in e.g. a production line, when the production line falls in a dangerous state, on the basis of a predetermined fail-safe operation, stops a part or entirety of the production line. Now, the dangerous state refers to a state when the emergency stop switch is pushed, a state when a sensor such as the light curtain detects entry of a man. In short, the safety PLC is employed in the production line or the like so that a worker can work more safely therein.

Further, the safety PLC must be suited to the safety standards such as the European Safety Standard or International Safety Standard, and so must be examined and certified by a certifying institution.

Now, the safety PLC includes the I/O module to which the safety device is connected and the CPU module. The I/O module and a packaged intrinsic control program correspond to each other in a one-to-one relationship. The control program is incorporated in the CPU module and serves as a safety program executed as the safety PLC.

In such a safety program, in order to program the safety program, as described above, advanced expertise and rich experience on the safety standard and safety control are required. Thus, a longer time and higher production cost have been needed as compared with the case of creating a general execution program.

In order to avoid such an inconvenience, JP-A-2007-25736 previously filed by the applicant of this application proposes a safety PLC in which the safety program is created by only connecting the I/O module to the CPU module. Specifically, a fixed function block suited to the safety standard, which is prepared previously, is connected on the basis of a connecting order of the I/O module. Thus, the safety PLC has become capable of being used with no advanced expertise.

In this way, in the PLC, since the execution program (safety program) is automatically created, even the user who does not have expertise has become capable of using the PLC without consuming time and cost.

However, in the above PLC, the execution program automatically created was black-boxed so that it could not be edited or even seen. The intrinsic control program serving as the execution program (function block in JP-A-2007-25736) also was the packaged fixed program and so black-boxed.

Namely, for the demand that a part of the execution program automatically created is desired to be edited, it could not be edited or even seen. Therefore, for example, even where there were slight changes in the production line, changes in hardware such as recombination of the I/O modules and changes in the external devices were needed. Namely, since the execution program automatically created cannot be edited, there are fears of generating the problems such as making wiring troublesome, an increase in a device establishing space, cost increase, etc.

SUMMARY OF THE INVENTION

This invention has been accomplished in view of such a circumstance. An object of this invention is to provide a PLC capable of seeing an execution program automatically created. Another object of this invention is to provide a PLC capable of editing an execution program automatically created.

This invention provides a PLC including an I/O module to which an external device is electrically connected, a CPU module executing an execution program controlling the I/O module, a connector for electrically connecting the respective modules to one another and a display device having a display screen, wherein the CPU module comprises a first storage unit which previously stores an intrinsic control program in which an operation program indicative of operation processing corresponding to the I/O module and input/output information item indicative of the operation processing are packaged; a second storage unit which previously stores a function block representing the operation processing by a single symbol; a third storage unit which previously stores an equivalent input/output information item equivalently representing the input/output information item by a graphical language; an ID number acquisition unit which reads out the ID number of the I/O module electrically connected to the connector; a program creation unit which calls the control program corresponding to the ID number read and automatically creates the execution program from the control program called; and a main storage unit which stores the execution program created by the program creation unit, and the display device comprises a display unit which causes the execution program stored in the main storage unit to be displayed by the function block and the equivalent input/output information item referring the second storage unit and the third storage unit.

In the PLC according to this invention, the intrinsic control program corresponding to the I/O module is previously stored in the CPU module (first storage unit). Using the intrinsic control program, the execution program is created. The CPU module includes the second storage unit which stores the function block symbolizing the part of the operation processing within the control program (operation program) and the third storage unit which stores the equivalent input/output information item equivalently representing the part on the input/output within the control program (input/output information) by the graphical language.

Namely, in the CPU module according to this invention, the function block and equivalent input/output information item representing the same meaning as the control program black-boxed within the first storage unit are previously stored. From the control program corresponding to the ID number of the I/O module connected, the execution program executed by the CPU module is created. In short, the execution program is constructed by the intrinsic control program. The execution program thus created is stored in the main storage unit.

The display device, because the CPU module includes the second storage unit and the third storage unit, can display, on the display screen, the execution program equivalently converted into the function block and the equivalent input/output information item on the basis of the execution program created. Namely, in accordance with the PLC according to this invention, the user can see the control program black-boxed as the corresponding function block and equivalent input/output information item.

The input/output information includes the number of inputs/outputs allotted to the I/O module, prescribed matters on the connection among operations of processing, etc. The graphical language includes a program description language defined in the IEC61131-3, for example, and a visually represented graphical symbol. The external device may be various devices (electric devices) electrically connectable to the I/O module.

Now, the PLC according to this invention may include a plurality of I/O modules. In this case, in the PLC of this invention the first storage unit previously stores a plurality of control programs so as to correspond to each the I/O modules; the second storage unit previously stores a plurality of function block so as to correspond to the operation processing of each the control programs; and the third storage unit program previously stores a plurality of equivalent input/output information items so as to correspond to input/output information of each the control programs. Further, the program creation unit, on the basis of the connecting order and ID numbers of the plurality of the I/O modules connected in order to the connector, automatically creates the execution program by connecting the plurality of control programs.

The program creation unit specifies the corresponding control programs from the ID numbers of the I/O modules connected, and connects the control programs in order on the basis of the connecting order of the I/O modules. For example, where the I/O modules are connected in order to the slot (connector) with the number increasing from the side nearer to the CPU module toward the side farther therefrom, the order with a larger slot number corresponds to the connecting order of the I/O modules. Automatic creation of the execution program is described in detail in Patent Reference 1. In this way, the execution program is automatically created and stored in the main storage unit.

Namely, in the PLC according to this invention, even where the plurality of I/O modules are connected, the execution program stored in the main storage unit can be displayed on the display screen by the function block and equivalent input/output information items.

Now, in the PLC according to this invention, it is preferable that the CPU module further comprises a fourth storage unit which previously stores an equivalent operation program equivalently representing the operation program of the control program in by the graphical language; and referring to the fourth storage unit, the display unit causes the function block displayed on the display screen to be display-converted into the equivalent operation program.

Thus, in the PLC, the part on the operation processing also of the control program black-boxed can be displayed as the equivalent operation program.

The display unit can display the execution program by the function block and equivalent input/output information item, and also for example, in a manner of selecting the function block, the operation program which is the contents of the function block can be displayed as the equivalent operation program.

Now, in the PLC according to this invention, it is preferable that the display device includes an editing unit capable of changing the arrangement order of the function blocks displayed on the display screen along the execution program stored in the main storage unit.

Thus, the user can edit the arrangement order of the function block displayed, i.e. the connecting order of the function block in the execution program. The edition can be executed in software on the display screen, which has been in conventional general PLCs. The editing unit includes an editing tool installed in the display device, a keyboard and a mouse.

Further, preferably, the display device includes the editing unit capable of editing the equivalent input/output information item displayed on the display screen by the graphical language. Namely, preferably, the editing unit has a function of editing the equivalent input/output information item in addition to changing the arrangement order of the function block.

The input/output information item black-boxed can be displayed as the equivalent input/output information item so that it can be edited by the graphical language used for equivalent display. Thus, the input/output information item which could not edited because it could not be seen conventionally can be freely edited.

Further, preferably, the display device includes the editing unit capable of editing the equivalent operation program displayed on the display screen by the graphical language. Namely, preferably, the editing unit has a function of editing the equivalent operation program in addition to the above function.

Thus, as described above, the operation program black-boxed can be edited. The user can edit the equivalent operation program displayed by the graphical language. Namely, in the execution program, more advanced editing can be realized. In the PLC having these editing units, with no addition of hardware, the execution program automatically created can be modified.

Now, in the PLC according to this invention, it is preferable that the CPU module further comprises a user storage unit which is a region different from the main storage unit and stores the execution program edited by the editing unit. Namely, the execution program after edited is stored in the user storage unit, and the execution program created by the program creation unit is not overwritten by the edition but stored, as it is, in the main storage unit.

Thus, the user can cause the execution program (default program) automatically created to be executed and also the execution program edited (user program) to be executed. The user storage unit may store the entire execution program edited, or may store only the part edited. Where only the part edited is stored, the memory required may be correspondingly small. However, program designing become more difficult as compared with the case where the entire execution program is stored.

Meanwhile, in the PLC according to this invention, it is preferable that the graphical language is a ladder diagram, a function block diagram, a structured text or an instruction list. These languages are frequently employed in the PLC, thereby facilitating the user's understanding and edition.

Further, the PLC according to this invention may be employed as the safety PLC. In this case, in the PLC according to this invention, the external device is a safety device on safety control, and the execution program is a safety program. In the PLC, particularly, in the safety PLC, the automatic creation of the safety program is actually carried out (Patent Reference 1) so that there is a very strong demand that the safety program created is desired to be displayed and edited. Thus, by applying the PLC according to this invention to the safety PLC, the above demand can be responded to and the above effect of this invention can be remarkably shown.

As the safety device, listed are a detecting device such as a doubled emergency stop switch, a light curtain, a door lock sensor, a mat switch or a laser scanner, and a driving device such as a motor on safety control. The driving device on safety control is various devices (e.g. machining robot) on a production line which must be stopped when a dangerous state is detected by the above detecting device, and a driving device for executing the operation necessary for safety control. The safety program is a program which controls the I/O module to which the above safety device is connected and is executed by the CPU module. The safety program is suited to the safety standard.

DETAILED DESCRIPTION OF PREFERRED EMBODIMENTS

Figure 1:
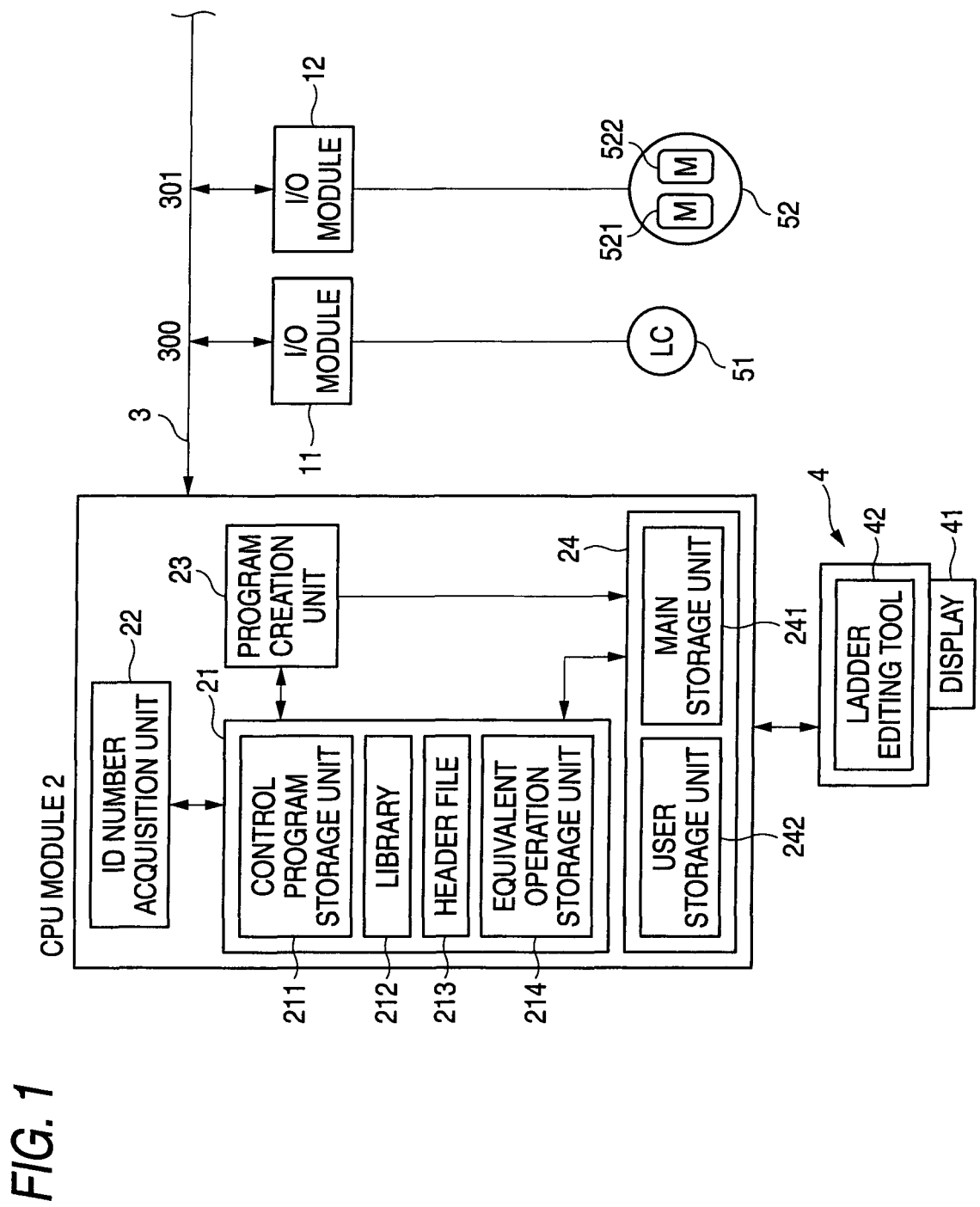
FIG. 1 is a schematic view of the safety PLC according to this embodiment.
Figure 2:
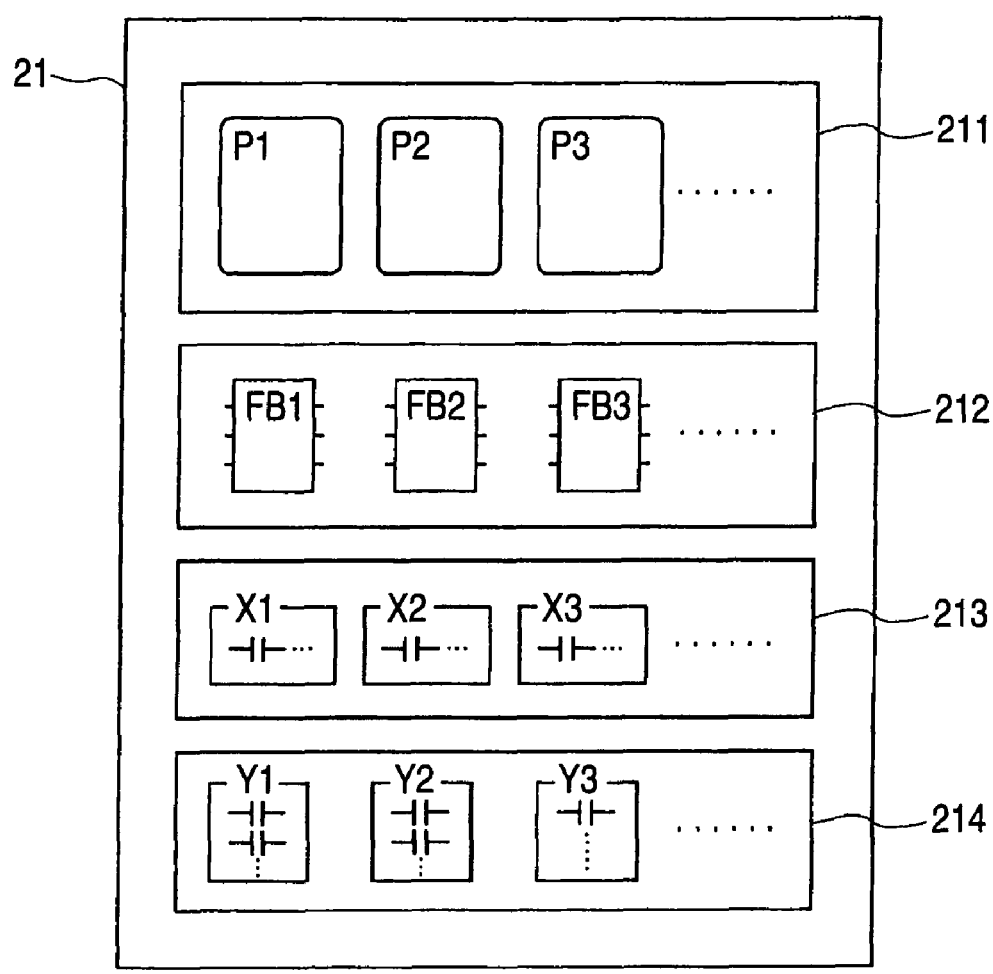
FIG. 2 is a schematic view of a system storage unit 21.

Next, a more detailed explanation will be given of this invention with reference to an embodiment thereof. In this embodiment, the explanation will be given of an application of the PLC according to this invention to the safety PLC. Referring to FIGS. 1 and 2, the construction of the safety PLC according to this embodiment will be explained. FIG. 1 is a schematic view of the safety PLC according to this embodiment. FIG. 2 is a schematic view of a system storage unit 21.

The safety PLC according to this embodiment includes, as shown in FIG. 1, I/O modules 11, 12; a CPU module 2; an input/output bus 3; and a personal computer (hereinafter referred to as a PC) 4. The connections of the input/output bus 3 to the I/O modules are referred to connecting points (300, 301, . . . ) in order from the side of the CPU module.

The I/O module 11 is electrically connected to the connecting point 300 of the input/output bus 3. The I/O module 11 is an S-STP module to which a light curtain 51 is connected. The I/O module 11, when an input from the light curtain 51 is interrupted, interrupts the output of itself. Namely, the safety device connected to the I/O module 11 is a detecting device for detecting whether or not a dangerous state has occurred. The I/O module 11 stores an intrinsic ID number.

The I/O module 12 is electrically connected to the connecting point 301 of the input/output bus 3. The I/O module 12 is a relay module to which a driving device 52 safe-controlled is connected. The I/O module 12 outputs an input signal as it is. The safety device connected to the I/O module 12 is a device for stopping the operation when the dangerous state is detected by the detecting device such as the light curtain 51. The I/O module 12 stores an intrinsic ID number different from the ID number stored in the I/O module 11.

The CPU module 2 includes a system storage unit 21, an ID number acquisition unit 22, a program creation unit 23 and a safety program storage unit 24. The system storage unit 21 includes a control program storage unit 211 (corresponding to a first storage unit in this invention), a library 212 (corresponding to a second storage unit in this invention), a header file 213 (corresponding to a third storage unit in this invention) and an equivalent operation storage unit 214 (corresponding to a fourth storage unit in this invention).

As shown in FIG. 2, the control program storage unit 211 previously stores packaged control programs (P1, P2, . . . ) for the I/O modules connectable to the CPU module 2 through the input/output bus 3. These programs are created in a C language and packaged so as to correspond to the I/O modules connectable, respectively. Concretely, each control program (P1, P2, . . . ) packages an operation program representing the operation processing corresponding to the I/O module and an input/output information item on the operation processing. In this embodiment, the control program P1 is a program corresponding to the I/O module 12 and the control program P2 corresponding to the I/O module 11.

The library 212 stores function blocks (FB1, FB2, . . . ) each of which represents by a single symbol the operation program of each of the control programs (P1, P2, . . . ) stored in the control program storage unit 211. Now, the function block FB1 corresponds to the operation program of the control program P1. Likewise, FB2 and FB3 correspond to P2 and P3, respectively.

The header file 213 previously stores equivalent input/output information items (X1, X2, . . . ) each of which equivalently represents in a ladder diagram the input/output information item of each of the control programs (P1, P2, . . . ) stored in the control program storage unit 211.

The equivalent operation storage unit 214 previously stores equivalent operation programs (Y1, Y2, . . . ) each of which equivalently represents in a ladder diagram the operation program of each of the control programs (P1, P2, . . . ) stored in the control program storage unit 211. The equivalent operation program represents the contents of the corresponding function block (FB1, FB2, . . . ).

In the system storage unit 21, the single control program is correlated with the function block and equivalent input/output information item. Further, the operation program and function block of the control program are correlated with the equivalent operation program. In this embodiment, the control program P1 corresponds to the function block FB1 and equivalent input/output information item X1, and the function block FB1 corresponds to the equivalent operation program Y1. It should be noted that as the respective storage units, storage unit such as ROM are used.

The ID number acquisition unit 22 reads out the ID numbers of the I/O modules 11, 12 connected to the input/output bus 3. The CPU module 2 recognizes by the ID number acquisition unit 22 that the I/O module 11 is electrically connected to the connecting point 300 and the I/O module 12 is electrically connected to the connecting point 301. In short, the CPU module 2 recognizes the ID numbers and their connecting order.

The program creation unit 23, on the basis of the connecting order and ID numbers of the I/O modules 11, 12, automatically creates a safety program by connecting a plurality of control programs. Specifically, the control program corresponding to the ID number read out is uniquely determined from the control program storage unit 211. Namely, the I/O module 12 and I/O module 11 correspond to the control program P1 and the control program P2, respectively.

The control programs determined are connected in the connecting order. In this embodiment, toward the connecting point 300 (301→300), the corresponding control programs are connected in order to create a safety program. This safety program is stored in the main storage unit 241 of a safety program storage unit 24 described later.

The safety program storage unit 24 includes the main storage unit 241 and a user storage unit 242. The main storage unit 241 stores the safety program created by the program creation unit 23. The user storage unit 242 is provided at a region separated from the main storage unit 241 and stores the safety program after edited. The edition will be described later. The user can select the safety program stored in the main storage unit 241 or the safety program stored in the user storage unit 242.

The PC 4 includes a display 41 and an input unit not shown (keyboard, mouth, etc.) and is connected to the CPU module 2. In the PC4, a ladder editing tool 42 (corresponding to a display unit and an editing unit in this invention). The ladder editing tool 42 causes the safety program stored in the main storage unit 241 to be displayed using the function block (FB1, FB2, . . . ) and equivalent input/output information item (X1, X2, . . . ) or equivalent operation program (Y1, Y2, . . . ) on the display 41.

The safety program stored in the main storage 241 is created by connecting the control programs (P1, P2, . . . ). Therefore, referring to the library 212 and header file 213, the PC 4 determines the corresponding function blocks (FB1, FB2, . . . ) and equivalent input/output information items (X1, X2, . . . ) and can equivalently display the safety program.

Figure 3:
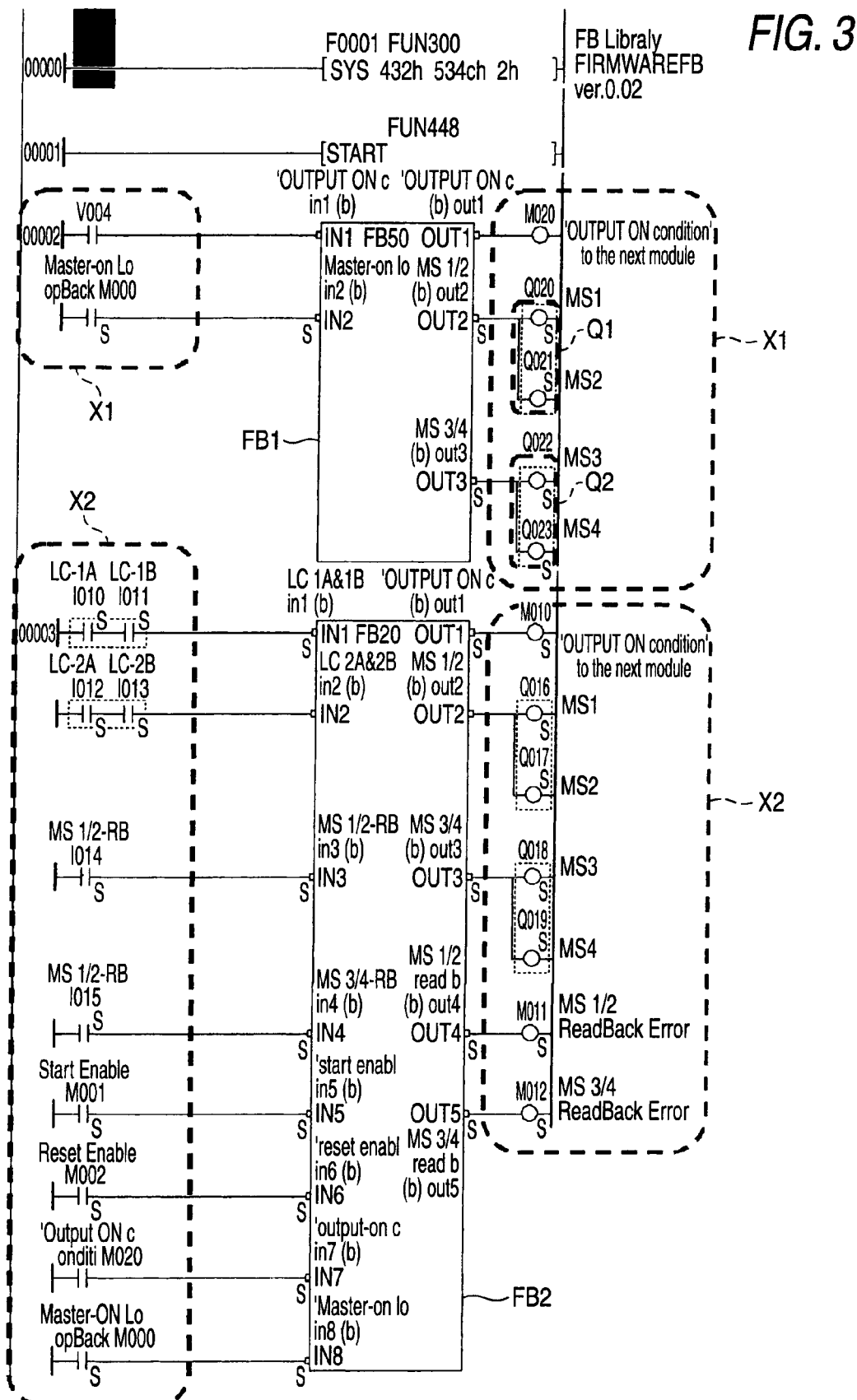
FIG. 3 is a view showing the safety program displayed on a display 41 by function blocks and equivalent input/output information items.
Figure 4:
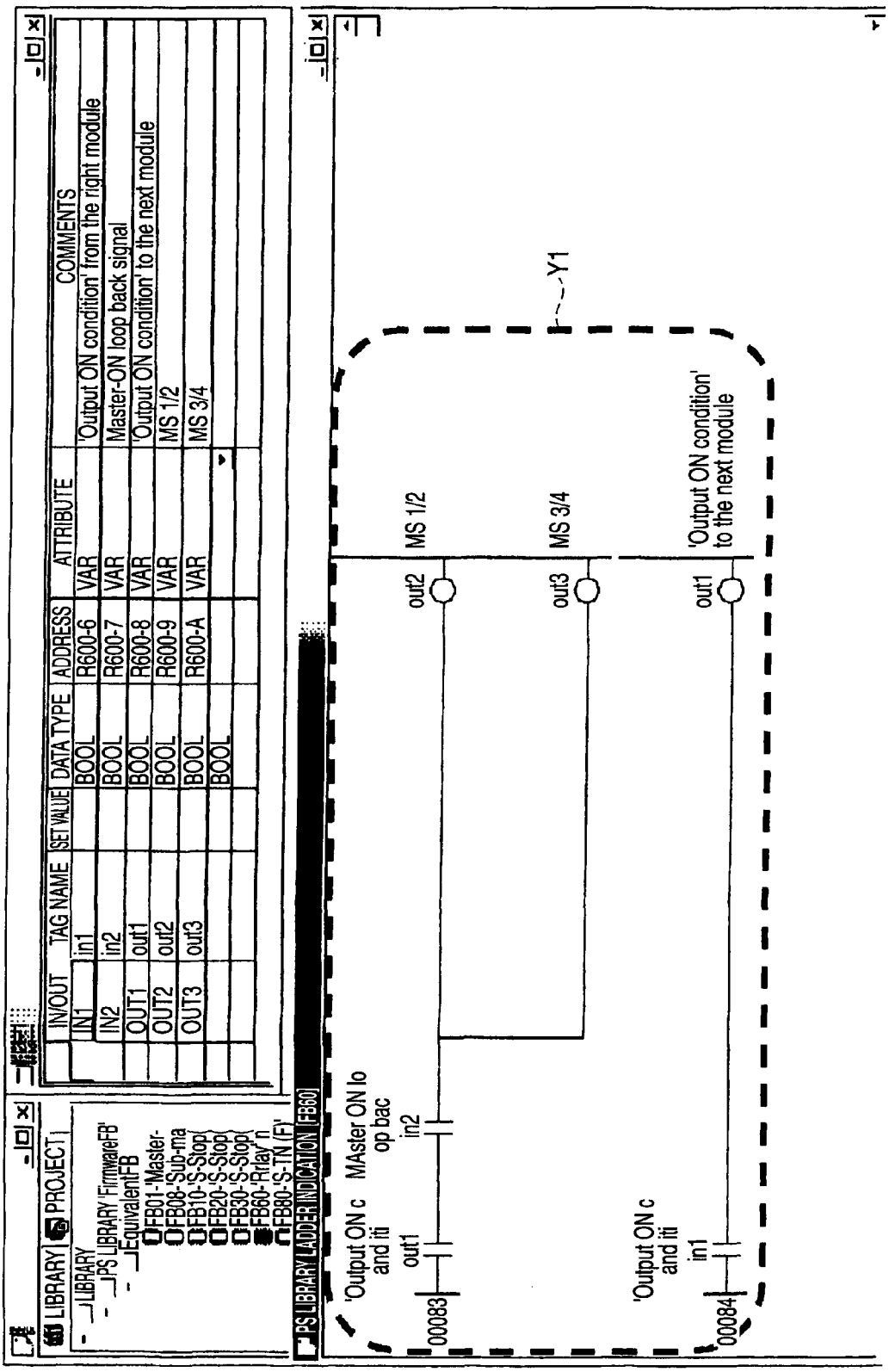
FIG. 4 is a view showing the equivalent operation program corresponding to the function block FB1 (Relay) displayed on the display 41.
Figure 5:
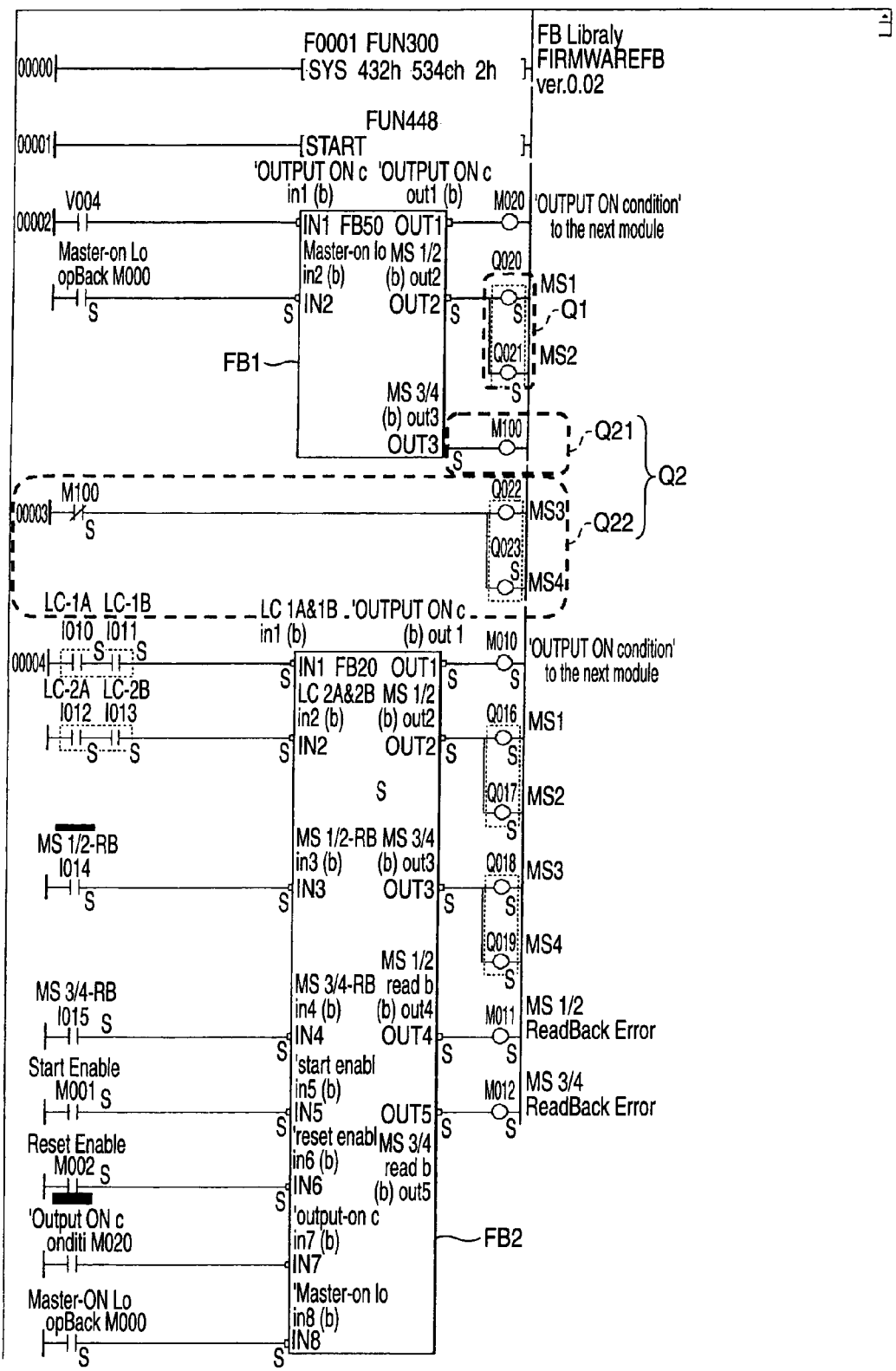
FIG. 5 is a view showing the safety program after FIG. 3 has been edited, displayed on the display 41.

Now referring to FIGS. 3 to 5, a detailed explanation will be given of the display and edition of the safety program stored in the main storage unit 241. FIG. 3 is a view showing the safety program displayed on the display 41 by the function blocks and equivalent input/output information items. FIG. 4 is a view showing the equivalent operation program corresponding to the function block FB1 (Relay) displayed on the display 41. FIG. 5 is a view showing the safety program after FIG. 3 has been edited, displayed on the display 41.

As shown in FIG. 3, by the ladder editing tool 42, the safety program stored in the main storage unit 241 is displayed using the function blocks FB1, FB2 and equivalent input/output information items X1, X2. The function block FB1 and equivalent input/output information item X1 correspond to the I/O module 12 (Relay). The function block FB2 and equivalent input/output information item X2 correspond to the I/O module 11 (S-STP).

Specifically, in this embodiment, the safety program automatically created is displayed as a ladder diagram on the display 41. For example, Q1 of the equivalent input/output information item X1 represents an output contact with the first motor 521 of a driving device 52 connected to the I/O module 12. Similarly, Q2 represents an output contact with the second motor 522. In this case, Q1 and Q2 are same outputs. Namely, if Q1 is ON, Q2 is also ON.

Further, now if the function block FB1 is selected by the user, as shown in FIG. 4, the equivalent operation program Y1 corresponding to the contents of the function block FB1 is displayed. Namely, the ladder editing tool 42 causes the operation program of the control program selected to be displayed on the display 41. On the table displayed right above in FIG. 4, a relationship between the tag name (in1, out1, etc.) in the ladder diagram and the address in an internal register (not shown) is described.

The ladder diagram shown in FIG. 3 is equivalent to the safety program stored in the main storage unit 241, and can be displayed because the CPU module 2 includes the library 212 and header file 213. The ladder diagram shown in FIG. 4 is equivalent to the operation program of the control program P1 and can be displayed because the CPU module 2 includes the equivalent operation storage unit 214.

Now, an explanation will be given of the case where the ladder diagram is edited. The edition will be carried out by the ladder editing tool 42 in such a manner that the user employs the keyboard or mouse. The ladder diagram shown in FIG. 5 will be explained as an example of the ladder diagram after edited. As shown in FIG. 5, in this edition, the output contact Q2 in FIG. 3 is edited (Q2 after edited is referred to as Q21 and Q22).

Concretely, first, as the output information of Q2, between the function block FB1 and the output destination of Q2, the internal register (not shown) of the CPU module 2 is inserted (Q21). Further, between the internal register and the output destination of Q2, a contact B is inserted (Q22). By this edition, the output signal of Q2 is once stored in the internal register, and the signal stored in the internal register is inverted through the contact B and outputted.

After edited as shown in FIG. 5, this safety program after edited can be stored in the user storage unit 242 of the CPU module 2. The user can select the safety program (default program) in the main storage unit 241 or the safety program (user program) in the user storage unit 242 so that the safety program thus selected is executed.

As a result of the above edition, before the edition, Q1 and Q2 gave the same outputs, whereas after the edition, Q2 has become the inverted output of Q1; namely when Q1 gives an ON output, Q2 gives an OFF output. In this case, if the safety program after the edition is executed, before the edition, the first motor 521 and second motor 522 did the same operation, whereas when the first motor 521 is operating, the second motor 522 does not operate.

In short, even where the object to be supplied with driving force by the second motor 522 is changed, the ladder editing tool 42 edits the equivalent input/output information item X1 so that the safety program is edited so as to be suited to this change.

Conventionally, even where it is desired that the control programs are edited, each of the control programs and the safety program was black-boxed so that they could not be even seen. Therefore, of course, the programs could not be edited. As a result, even with a slight change as described above, it was required to add a new I/O module and to carry out a complicated wiring changing work.

On the other hand, in accordance with the safety PLC according to this embodiment, the safety program including the control programs can be displayed on the display 41, edited and executed. Correspondingly, the safety PLC according to this embodiment can provide effects of simplification of a hardware circuit, saving of wirings and space, restriction of occurrence of erroneous wiring, enhancement of designing work efficiency, cost reduction, etc.

Further, as shown in FIG. 4, since the contents (operation processing of the control program) of the function block selected can be displayed, in the same manner as described above, the ladder diagram displayed can be edited by the editing tool 42.

Further, the function blocks can be also rearranged. Namely, the arranging order (FB1→FB 2) of the function blocks displayed along the safety program can be changed (FB2→FB 1).

As described hitherto, in accordance with the safety PLC according to this embodiment, the safety program and intrinsic control program constituting the safety program can be seen and further edited.

Additionally, although the equivalent input/output information item and equivalent operation program in this embodiment were represented in the ladder diagram, they may be represented in the graphical language other than the ladder diagram. The graphical language includes a program description language prescribed in IEC61131-3 such as the ladder diagram, a function block diagram, a structured text or an instruction list, or a visually represented unique graphical symbol. Further, the shape or pattern of the symbol (function block) should not be limited to this embodiment. In any case, the same effect as described above can be obtained.

Further, the safety PLC according to this embodiment is not limited to the safety PLC but may be also applied to a general PLC. In accordance with the safety PLC according to this embodiment, even where it is applied to the general PLC, as described above, the execution program automatically created can be displayed and edited.

What is claimed is:

1. A PLC comprising:
an I/O module to which an external device is connected;
a CPU module for executing an execution program controlling the I/O module;
a connector for electrically connecting the I/O module and the CPU module to each other; and
a display device including a display screen,
wherein the CPU module includes:
   a first storage unit which previously stores an intrinsic control program in which an operation program indicative of operation processing corresponding to the I/O module and an input/output information item indicative of the operation processing are packaged;
   a second storage unit which previously stores a function block representing the operation processing by a single symbol;
   a third storage unit which previously stores an equivalent input/output information item equivalently representing the input/output information item by a graphical language;
   an ID number acquisition unit which reads out ID number of the I/O module electrically connected to the connector;
   a program creation unit which calls one of the control programs corresponding to the read ID number and automatically creates the execution program from the called control program; and
   a main storage unit which stores the execution program created by the program creation unit, and
wherein the display device includes a display unit which causes the execution program stored in the main storage unit to be displayed by using the function block and the equivalent input/output information item by referring to the second storage unit and the third storage unit.

2. The PLC according to claim 1, wherein
the PLC includes a plurality of the I/O modules;
the first storage unit previously stores a plurality of the control programs so as to correspond to the operation processing of the I/O modules, respectively;
the second storage unit previously stores a plurality of function blocks so as to correspond to the control programs, respectively;
the third storage unit previously stores a plurality of the equivalent input/output information items so as to correspond to the input/output information item of the control programs, respectively; and
the program creation unit automatically creates, on a basis of a connecting order and ID numbers of the plurality of the I/O modules connected in order to the connector, the execution program by connecting the plurality of the control programs.

3. The PLC according to claim 1, wherein
the CPU module includes a fourth storage unit which previously stores an equivalent operation program equivalently representing the operation program of the control program by the graphical language; and
by referring to the fourth storage unit, the display unit causes the function block displayed on the display screen to be displayed by converting into the equivalent operation program.

4. The PLC according to claim 2, wherein the display device includes an editing unit for changing an arrangement order of the function block displayed on the display screen according to the execution program stored in the main storage unit.

5. The PLC according to claim 4, wherein the CPU module includes a user storage unit which is a region different from the main storage unit and stores the execution program edited by the editing unit.

6. The PLC according to claim 1, wherein the display device includes an editing unit for editing the equivalent input/output information item displayed on the display screen by the graphical language.

7. The PLC according to claim 3, wherein the display device includes an editing unit for editing the equivalent operation program displayed on the display screen by the graphical language.

8. The PLC according to claim 1, wherein the graphical language is a ladder diagram, a function block diagram, a structured text or an instruction list.

9. The PLC according to claim 1, wherein
the external device is a safety device on safety control; and
the execution program is a safety program.

* * * * *